UNITED STATES PATENT OFFICE.

CHARLES WADE STICKNEY, OF BUTTE, MONTANA.

PROCESS OF ROASTING SULPHUR-BEARING ORES.

SPECIFICATION forming part of Letters Patent No. 493,193, dated March 7, 1893.

Application filed March 17, 1892. Serial No. 425,240. (No specimens.)

*To all whom it may concern:*

Be it known that I, CHARLES WADE STICKNEY, a citizen of the United States, residing at Butte, county of Silver Bow, State of Montana, have invented certain new and useful Improvements in Processes of Roasting Sulphur-Bearing Ores, of which the following is a specification.

My invention is a process of roasting sulphur bearing ores in such a manner as to recover the sulphur in a solid form. The process is similar to that described in my patent No. 475,824, dated May 31, 1892, but embodies two new features, first, a mechanical agitation of the ore while the steam and air are acting upon the ore, and second, the use of a sulphate of the heavy metals of the ores being treated, which may be, and in practice will be, obtained from the roasted product.

The process is as follows: I bring the ore to a state of incandescence in any suitable furnace which permits of a mechanical agitation, such as the Bruckner rotary or Spence automatic or a simple cylindrical cupola provided with a mechanical stirrer. All such furnaces however, must be provided with means for feeding and discharge so that air shall be excluded in any great quantity except as regulated by the operator. When the ore is brought to a red or higher heat, steam is admitted to the ore along with a definite proportion of air, which proportion cannot be stated, but is regulated by an empirical test as hereinafter described. The resulting gases are then brought into contact with a solution of a sulphate of iron, copper or zinc. This contact is best effected by atomizing or spraying the solution in contact with the gases and condensing the mixture by passing it into a body of water holding the sulphate or mixed sulphates in solution. The sulphates may be obtained in any manner, but I have found that they can be obtained most cheaply and conveniently by putting a small portion of the roasted ore into the tank used to hold the solution, and that the effect of these sulphates of the heavy metals is about the same as that of the sulphates of the alkaline earths, namely: They cause the sulphur to aggregate in coarse particles, which readily settle, and prevent the formation of the milk of sulphur so unmanageable in a metallurgical process. The proportion of steam and air used though definite with the same conditions and ore, in practice varies considerably but is regulated by a simple test, viz: the smell of the solution must be such that there is no preponderating smell of either sulphureted hydrogen or sulphurous acid.

The metallurgical action of the process is as follows: The steam is decomposed by the incandescent ore, forming, with a portion of the ore, oxides of the metals and sulphureted hydrogen, and the air, with another portion, forms oxides of the metals and sulphurous acid gas. These gases escaping together remain a mere mixture until they encounter water, and there-upon the oxygen and hydrogen of each respectively unite forming water, and each dropping its sulphur. The sulphates I use in the water cause the sulphur to assume immediately a mechanical form which is not further acted upon by the incoming stream of gases, thus preventing the conversion of a large part of the sulphur into thionic acids.

Under certain conditions, it may be advisable to use separate furnaces for the steam roasting and the air roasting, the first, producing chiefly sulphureted hydrogen, and the second, producing sulphurous acid gas, and to mingle the gases from the two furnaces or to pass the two kinds of gas separately into the solution in the proper proportion.

I am aware that ores have been roasted by steam and air producing the two gases sulphureted hydrogen and sulphurous acid and these have been conducted together in contact with water to precipitate the sulphur. The process is impracticable on account of the impalpable form of the product.

I am also aware that in a process of recovering sulphur from the waste products of alkali works that the two gases above named have been brought together in contact with solutions of the chlorides of lime and magnesia to precipitate the sulphur in a manageable form. The process is impracticable in a process of ore roasting except in the neighborhood of alkali works where these chlorides can be obtained from waste products at a very low cost. In regions where ore is roasted in large quantities the chlorides cannot be obtained at any commercially practicable rate of expense.

I do not claim the parts of the process above named except in connection with ore roasting as described.

I am not aware that in any process of ore roasting the sulphates of the heavy metals have been used to recover the sulphur, nor that mechanical agitation of the ore while roasting, has ever been pursued in connection with the precipitation of the sulphur in solid form. The steam may be superheated or not, but the ore must be at red heat, either by action of superheated steam or fuel.

I claim—

1. The process of roasting ores and recovering their sulphur in solid form, by roasting one portion by means of steam whereby sulphureted hydrogen is generated and roasting another portion by means of air whereby sulphurous acid gas is generated, and mingling these gases in contact with a solution of the sulphate of a heavy metal substantially as described.

2. The process of roasting ores and recovering their sulphur in solid form by roasting one portion by means of steam and mechanical agitation, and roasting another portion by means of air and mechanical agitation and bringing the resulting gases into contact with each other and with a solution of a sulphate substantially as described.

3. The process of roasting ores and recovering their sulphur in solid form by roasting one portion by means of steam and mechanical agitation, and roasting another portion by means of air and bringing the resulting gases into contact with each other and with a solution of a sulphate, substantially as described.

CHARLES WADE STICKNEY.

Witnesses:
FAYETTE HARRINGTON,
MAJ. W. SMITH.